United States Patent
Marlow et al.

(10) Patent No.: US 9,883,144 B2
(45) Date of Patent: Jan. 30, 2018

(54) SYSTEM AND METHOD FOR REPLACING USER MEDIA STREAMS WITH ANIMATED AVATARS IN LIVE VIDEOCONFERENCES

(71) Applicant: FUJI XEROX CO., LTD., Tokyo (JP)

(72) Inventors: Jennifer Marlow, Palo Alto, CA (US); Scott Carter, Mountain View, CA (US); Laurent Denoue, Veneto (IT); Matthew L. Cooper, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/152,883

(22) Filed: May 12, 2016

(65) Prior Publication Data
US 2017/0332044 A1 Nov. 16, 2017

(51) Int. Cl.
*H04N 7/15* (2006.01)
*H04L 29/06* (2006.01)
*G06K 9/00* (2006.01)

(52) U.S. Cl.
CPC ......... *H04N 7/157* (2013.01); *G06K 9/00268* (2013.01); *G06K 9/00744* (2013.01); *H04L 65/1089* (2013.01); *H04L 65/601* (2013.01); *G06K 2009/00738* (2013.01)

(58) Field of Classification Search
CPC ............ H04N 7/15; H04N 7/152; H04N 7/14; H04N 7/147
USPC ............................................ 348/14.01–14.16
See application file for complete search history.

(56) References Cited

U.S. PATENT DOCUMENTS

| | | | | |
|---|---|---|---|---|
| 9,111,134 | B1* | 8/2015 | Rogers | G06K 9/00302 |
| 2008/0136895 | A1* | 6/2008 | Mareachen | H04N 7/147 |
| | | | | 348/14.03 |
| 2012/0206561 | A1* | 8/2012 | Huang | H04L 65/403 |
| | | | | 348/14.09 |
| 2012/0327177 | A1* | 12/2012 | Kee | H04N 7/15 |
| | | | | 348/14.08 |
| 2015/0229883 | A1* | 8/2015 | Lin | G06F 3/0346 |
| | | | | 348/14.08 |

OTHER PUBLICATIONS

Inkpen, K., et al., Me and My Avatar: Exploring Users' Comfort with Avatars for Workplace Communication, CSCW 2011, Mar. 19-23, 2011, Hangzhou, China, 4 pgs.
(Continued)

*Primary Examiner* — Melur Ramakrishnaiah
(74) *Attorney, Agent, or Firm* — Procopio, Cory, Hargreaves & Savitch LLP

(57) ABSTRACT

Example implementations provide the representation a remote user in a video-mediated meeting when the user webcam feed is not available or not used, such as if they are attending to a meeting via a wearable device without a camera, or are on-the-go and prefer not to display their webcam feed for privacy or bandwidth-related reasons. In such cases, the system will infer when the user is active in the meeting and allow users to select to display an animated set of keyframes (from past meetings or representing computer-based activity) as a proxy for the user representation. Example implementations may facilitate a richer representation of a meeting participant (as opposed to a static picture or no information) and may lead to enhanced social dynamics within the meeting.

20 Claims, 9 Drawing Sheets

(56) References Cited

OTHER PUBLICATIONS

Liao, Z., et al., Automated Video Looping with Progressive Dynamism, ACM Trans. Graphics, 2013, 10 pgs.
Tanaka, K, et al., Motion is Enough: How Real-Time Avatars Improve Distant Communication, Proceedings of Collaboration Technologies and Systems, 2013, pp. 465-472.
Tang, J. C., et al., Your Time Zone or Mine? A Study of Globally Time Zone-Shifted Collaboration, CSCW 2011, Mar. 19-23, 2011, Hangzhou, China, 10 pgs.
Tarzia, S. P., Sonar-based Measurement of User Presence and Attention, Ubicomp 2009, Sep. 30-Oct. 3, 2009, Orlando, Florida, 4 pgs.

* cited by examiner

SYSTEM AND METHOD FOR REPLACING USER MEDIA STREAMS WITH ANIMATED AVATARS IN LIVE VIDEOCONFERENCES

BACKGROUND

Field

The present disclosure is directed to conferencing systems, and more specifically, management of media streams for videoconferences.

Related Art

Related art web conferencing systems provide implementations for providing cues about participants by a participant panel that shows how people are connected (e.g., via computer or via telephone) and provides audio icons associated with the active speaker. Some related art implementations may provide real-time avatars by utilizing a camera for face tracking and by applying a computer graphics avatar on the model of facial movements detected by the camera.

In related art implementations, an avatar is a graphical representation of a videoconference participant provided by the software facilitating the videoconference. The related art avatars may also be provided as live streaming videos, wherein the live video feed of each conference participant is provided as the avatar of the conference participant.

SUMMARY

Aspects of the present disclosure can include an apparatus associated with a user in a video conference, which can involve a camera; and a processor, configured to, for a detection of one or more events from video of the camera that is transmitted to a server configured to manage the video conference, transmit instructions to the server to replace, in the video conference, the video from the apparatus with an animation having a plurality of keyframes selected from video frames involving the user.

Aspects of the present disclosure may further include a non-transitory computer readable medium storing instructions for an apparatus associated with a user in a video conference. The instructions can include, for a detection of one or more events from video of a camera that is transmitted to a server configured to manage the video conference, transmitting instructions to the server to replace, in the video conference, the video from the apparatus with an animation having a plurality of keyframes selected from video frames involving the user.

Aspects of the present disclosure can include an apparatus associated with a user in a video conference, which can involve sensing means; and processor processing means for, for a detection of one or more events from video of the sensing means that is transmitted to a server configured to manage the video conference, transmitting instructions to the server to replace, in the video conference, the video from the apparatus with an animation having a plurality of keyframes selected from video frames involving the user.

Aspects of the present disclosure may further include a method for an apparatus associated with a user in a video conference. The method can include, for a detection of one or more events from video of a camera that is transmitted to a server configured to manage the video conference, transmitting instructions to the server to replace, in the video conference, the video from the apparatus with an animation having a plurality of keyframes selected from video frames involving the user.

BRIEF DESCRIPTION OF DRAWINGS

The patent or application file contains at least one drawing executed in color. Copies of this patent or patent application publication with color drawing(s) will be provided by the Office upon request and payment of the necessary fee.

Exemplary embodiment(s) of the present invention will be described in detail based on the following figures, wherein.

DETAILED DESCRIPTION

Figure 1:
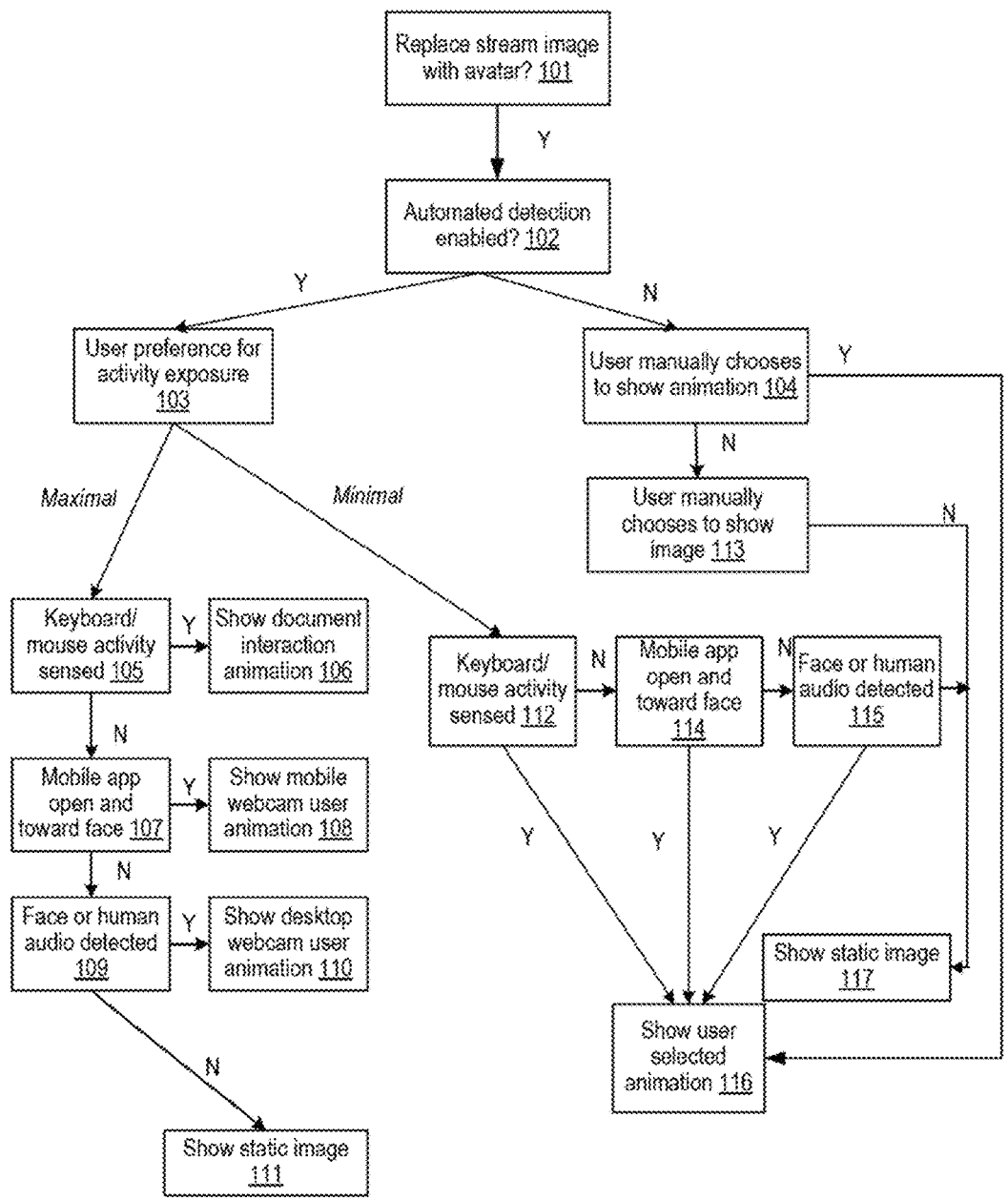
FIG. 1 illustrates a flow diagram, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In video conferencing systems, the participants may be participating in the video conference in different ways. For example, some users may be participating on a mobile phone with a zoomed view on their face via the phone camera. For such users, sometimes the communication connection may be unstable between the mobile phone and the devices of the other user, which may result in the portrait of the user captured from the phone camera being used as a static avatar. Sometimes, the phone camera is disabled to increase throughput of the mobile phone. To the video conferencing system and the other participants, the static avatar or disabled video may be interpreted as the user not being a participant in the meeting, even though the user may have technical reasons that prevent the video streaming. To address this misinterpretation, the example implementations detect the situations where the static avatar or disabled video may occur and the user does not have a full video stream, and replace the video with a generated animated avatar to indicate that the user is an active participant in the video conference.

Example implementations are directed to systems and methods that provide an animated or static avatar when a web camera feed is not present either automatically or manually through user control. In example implementations, the avatar can be generated from keyframes derived from previous meetings involving the user, in cases where the user provides access to their video feed during a meeting. The avatar can also be generated from keyframes of that person captured earlier in the meeting for cases where the feed is available at first, but then not available as the meeting progresses.

Figure 2A:
FIG. 2A illustrates an example of a desktop activity-based avatar for web browsing or typing, in accordance with an example implementation.
Figure 2B:
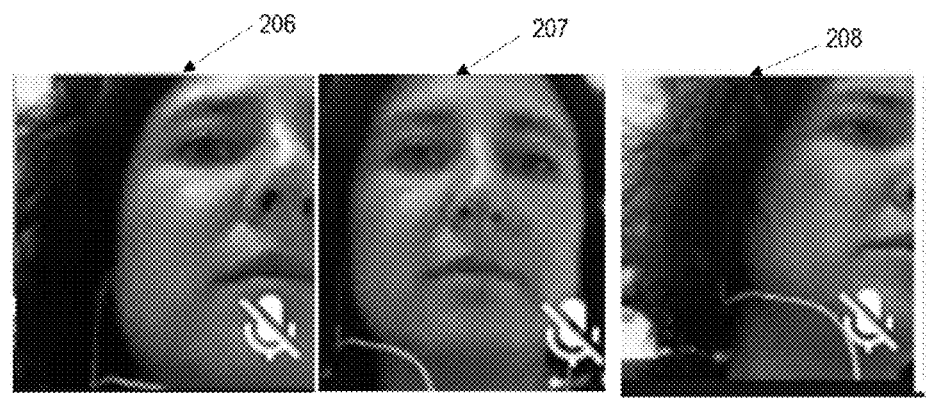
FIG. 2B illustrates a sample avatar from a mobile device, in accordance with an example implementation.

In example implementations, the avatar can also depict device screen activity and not just web camera activity. For example, the animation replacing the live stream can utilize previous or fake screenshots of the user desktop, showing mouse moving, and/or typed text, depending on the desired implementation (see FIG. 2A). The avatar can match the sensed context of the user, for example, by using keyframes captured from a mobile device when the user is connected to the meeting on a mobile or wearable device (FIG. 2B).

In additional example implementations, keyframes can be blended together to simulate realistic motion. The system can incorporate motion sensors to ensure that the animation is only displayed when a person is active in the meeting. The system can infer that the user is interacting with the meeting even in the absence of a web camera stream for a variety of scenarios.

In an example scenario involving a user having a mobile device or smartwatch, when the system detects that the meeting application is in focus and detects that the watch or mobile device is being actively used through the use of sensors, the system infers that the user is active in the meeting. A variety of different sensors could be used to detect active use. Many wearables or Internet of Things (IoT) devices may have galvanic sensors that indicate that the wearable device is currently being worn. Furthermore, accelerometers can detect an orientation of the device (e.g. in an upright position versus being at the side of the user). On mobile devices, light sensors can detect that the mobile device is not in an environment with low to no light (e.g. the pocket of the user). Furthermore, accelerometers can determine that the device is upright and likely being utilized, versus lying flat (e.g. on a table).

In an example scenario involving a user having a laptop with a webcam that is not streaming (e.g., other users of the conference cannot see the head of the user), the system can be configured to turn on the web camera to snap photos which are then stored locally. The system can be configured to analyze the photos for faces and gaze toward the screen. If the user is looking toward the screen and the system detects that the meeting window is in focus, then the system infers the user is active in the meeting. The number of faces detected by the system can also trigger the substitution of the live webcam for the animation (e.g., a child or waiter appeared in the stream while the person is conducting the meeting).

In an example scenario involving a user having a laptop with no webcam, the system can determine if the meeting window is in focus. If so, and if the system detects any mouse or keyboard events within the window, then the system can infer the user is active in the meeting. At times, the user will be passively observing the meeting and not interacting with the screen. To distinguish this passive user case from the user being completely absent, the system can occasionally issue sonar pings in the inaudible frequency range from the laptop speakers, and detect from subsequent microphone recordings subtle variations in the variance of the intensity of received audio echoes. If the user is wearing headphones, then the system may be able to integrate headphone presence sensors, depending on the desired implementation.

In example implementations, video-mediated conferences may contain a mix of participants who may be depicting themselves in a variety of ways, such as with a live webcam stream, with a static avatar, or with mere text (e.g. a name on a list). Additionally, during the course of a meeting, a participant may change their depiction (e.g., they may lose or turn off their video feed when working from home). Regardless of the reason why a person might not have a continuous video feed of themselves during a meeting, a lack of information about a participant can be detrimental to the group. For example, seeing video feeds of other participants while watching an online presentation may make an individual pay more attention to the content, and similarly, make the individuals believe that others are paying more attention and that the material is more interesting compared to when the video feeds are not present.

Thus, it can be useful for a video conferencing system to detect why a user video feed may be lost or not present and to provide additional cues that a user may elect to display to indicate that the user is active in the meeting.

Example implementations described herein addresses contexts or situations in which either a camera is not available or bandwidth limitations prevent a real-time approach from being ideal. In example implementations, the system may utilize frames from the user web camera or mobile camera, to replace the live video view and create an animated placeholder. Frames can be analyzed to extract eye, nose, and mouth locations, depending on the desired implementation.

Figure 3A:
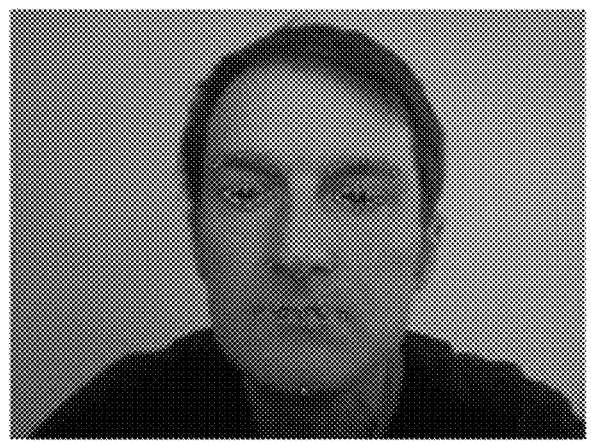
FIGS. 3A to 3C illustrate an example web camera image with facial feature detection systems, in accordance with an example implementation.
Figure 3B:
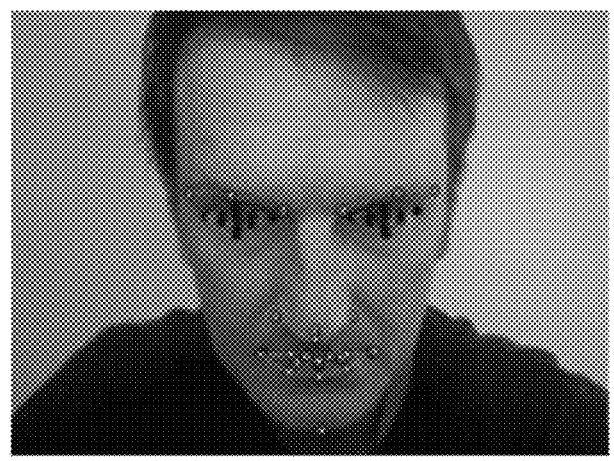
Figure 3C:
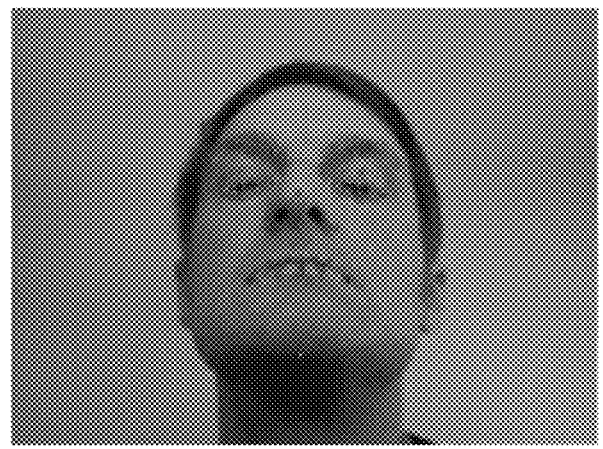

To prevent generating out of context placeholders, example implementations select frames where the user is not talking (e.g., no mouth motion). FIGS. 3A to 3C illustrate example webcam images filtered through a live Web-based face detection system. In the example of FIG. 3A, detection is conducted through straight-on views of the face. When the face is directed down (FIG. 3B) or up (FIG. 3C) feature points from the nose may bunched too close to the mouth and eyes, respectively. Based on the differences as illustrated between FIGS. 3A to 3C, example implementations can not only detect facial keypoints but also detect correspondences between them, which allows the keyframe selection algorithm to prefer faces with better (more straight-on) poses for inclusion in the rendered animation.

In example implementations, preferred frames for processing are those frames in which both eyes are visible and the eye, nose, and mouth feature points indicate a straight-on view (FIGS. 3A to 3C). In example implementations, the position of the eyes and nose can be utilized to decide the order of the frames. Specifically, a set of nose (X,Y)

coordinates from successive frames generates a two dimensional path. To merge that path with another from a later sequence, example implementations select the subset of frames that maximizes the continuity of the paths. The paths are also used to detect head motions that strongly indicate an emotional statement, such as nodding up and down to indicate approval and moving sideways to indicate negativity. Once detected, the system rejects the head motions because they may not be in context with the conference. Similarly, when merging paths of successive sequences, the system can avoid the generation of paths that indicate negative or positive nods, depending on the desired implementation.

In example implementations, the system can also utilize lighting operated by the devices in a dynamic matter to make the placeholder more alive. For example, if the user placeholder is shown at a lower resolution, this technique can in itself make other peers feel as if the user was still live. The effects can also be applied over a sequence of selected frames. The background and/or foreground of the scene can be independently modified. Finally, when a person re-establishes a connection with the live web camera, the system progressively shows the live frames; the system detects faces and translates live frames to make the face position match the stored keyframe face position.

FIG. 1 illustrates a flow diagram, in accordance with an example implementation. At 101, the system determines whether the currently streaming video should be replaced with an avatar. The determination may be based on the user having no web camera, the user has turned off the web camera, or the system being configured to do so when multiple faces are detected in the webcam stream, among other examples according to the desired implementation. The user can configure the system to substitute avatar images automatically or manually.

At 102, the system can determine if automated substitution is enabled from settings or from other methods according to the desired implementation. When the substitution is automated (Y), the user can further configure the software to select replacement avatars that are related to their sensed activity, so that the system utilizes the user preference for activity exposure at 103. Otherwise (N), the flow proceeds to 104 to determine if the an animation should be manually provided to other users.

When the system utilizes the user preference for activity exposure at 103, a determination is made as to whether the user preference is maximal or minimal. The difference between maximal and minimal can be implemented as a threshold for activity exposure, wherein an activity exposure exceeding a threshold (e.g. 50% from settings or other methods) can be considered as maximal, and values below the threshold can be considered as minimal.

In the maximal activity exposure case, the system checks whether the user is interacting with the screen using their keyboard/mouse at 105. If so (Y), the flow proceeds to 106 to provide a document interaction animation. The animation can be a graphical animation that illustrates that the user is conducting a document interaction, or can also be generated from selected keyframes depending on the desired implementation. As explained in greater detail below, FIG. 2A illustrates an example of an animated thumbnail illustrating the user interacting with a document.

If keyboard/mouse activity is not sensed in the maximal configuration (N) at 105, then the flow proceeds to 107 wherein a determination is made as to whether the user is connected to the meeting with a mobile or wearable device. If so (Y), then the flow proceeds to 108 wherein the system shows an animation composed of web camera (e.g., face) images, prioritizing images in which the user was connected via a mobile application as illustrated in FIG. 2B. If not (N), then the flow proceeds to 109 to conduct face detection or human audio detection.

Figure 2C:
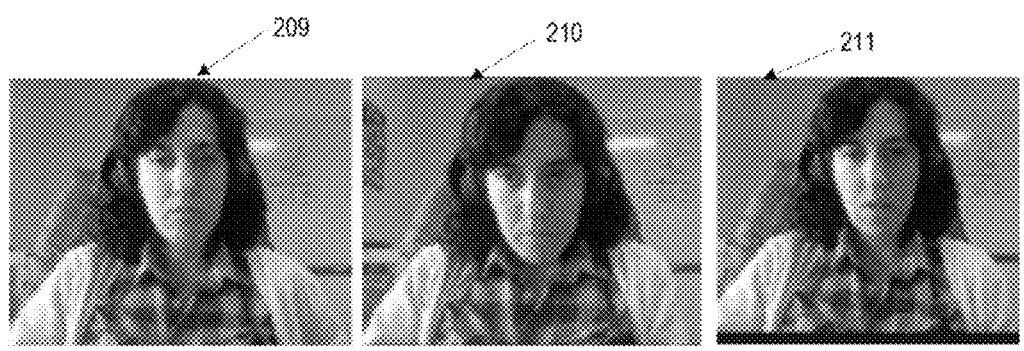
FIG. 2C illustrates a sample avatar from a non-streaming web camera in accordance with an example implementation.
Figure 2D:
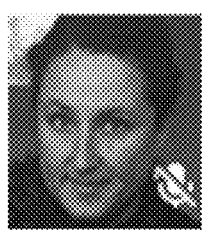
FIG. 2D illustrates a sample avatar from a device with no web camera, in accordance with an example implementation.

In the flow at 109, the system conducts facial or audio detection. If the system detects the user face or detects audio from the user (Y), then the flow proceeds to 110 to provide a desktop web camera user animation. In this example, if the user is connected to the meeting with a desktop application or website, the system can be configured to show an animation composed of webcam (face) images, prioritizing images in which the user was connected via a desktop application or webcam as illustrated in FIG. 2C as explained below. Otherwise (N) the system has no sensor information for the user, and the system proceeds to the flow at 111 and thereby selects a static (profile) image for streaming as illustrated in FIG. 2D as explained below.

In the minimal activity exposure case, the flow proceeds to 112, wherein the system checks whether the user is interacting with the screen using their keyboard/mouse using similar procedures as that from the flow at 105. If so (Y) then the flow proceeds to 116 to provide the user selected animation. Otherwise (N), then the flow proceeds to 114 wherein the application of the user device orients the camera towards the face of the user.

At 114, the system determines if an application is open and the camera is oriented at the face of the user. The face of the user can be detected from the extraction of facial features. If so (Y), then the flow proceeds to 116 to provide the user selected animation. Otherwise (N), the flow proceeds to 115, wherein the system determines if the face of the user is detectable from the video or if audio is detected. If so (Y), then the flow proceeds to 116, otherwise (N), the flow proceeds to 117 to provide a static image.

When automatic detection is not enabled at 102 (N) the flow proceeds to 103 to determine if the user has manually selected to show an animation. If so (Y), then the flow proceeds to 116 to provide the user selected animation. Otherwise (N), the flow proceeds to 113 where the system determines that the user has manually selected the image, and then the flow proceeds to 117 to provide the static image selected by the user.

Thus in example implementations, the user can decide to have the selected avatar not reflect their current, sensed activity (e.g., for privacy reasons). In that case, the system selects a user-supplied animation if any sensor information is detected, and a static image if sensor information is not detected. Finally, the user can also toggle to a manual mode to swap in user created animations only at times of their choosing.

FIG. 2A illustrates an example of a desktop activity-based avatar for web browsing or typing, in accordance with an example implementation. Specifically, FIG. 2A illustrates a desktop activity-based avatar for web browsing at 200, 201, and 202, or typing at 203, 204 and 205. In the example of FIG. 2A for web browsing, frames 200, 201 and 202 were selected for use to be incorporated in an animation for representing web browsing.

Similarly, frames 203, 204, and 205 were selected for use to be incorporated into an animation for representing typing. When the application of the desktop or sensors of the system detect typing from the user as indicated in the flow of 105 and 112 of FIG. 1, and when keyboard or mouse activity is detected, the animation composed from frames 203, 204 and 205 can be provided by the system to other users in the video conference. The frames 203, 204, and 205 can be selected from screenshots shared from the device during previously recorded web conferences, from the present conference, or by other methods depending on the desired implementation.

FIG. 2B illustrates a sample avatar from a mobile device, in accordance with an example implementation. In the example implementation of FIG. 2B, frames 206, 207 and 208 were selected to be used as an animated avatar for a mobile device user. In the example implementation involving a mobile device, the connection from the mobile device or the bandwidth available may be inconsistent, which may necessitate the replacement of the video stream from the mobile device with the animated avatar. Thus, in example implementations, when the apparatus managing the video conference detects that the mobile device is still connected to the video conference but that the avatar should be replaced, the apparatus thereby selects frames to be utilized in an animated avatar.

FIG. 2C illustrates a sample avatar from a non-streaming web camera in accordance with an example implementation. In the example implementation of FIG. 2C, frames 209, 210 and 211 were selected to be used as an animated avatar for when the web camera is not streaming. The frames can be selected pre-emptively by the user and sent to the apparatus managing the video conference, or the frames can be pre-selected from prior conferences or the present video conference, depending on the desired implementation.

FIG. 2D illustrates a sample avatar from a device with no web camera, in accordance with an example implementation. In the example of FIG. 2D, a static image is provided to the system when the user is operating a device with no web camera, and the avatar can be the avatar selected by the video conference application.

FIGS. 3A to 3C illustrates example web camera image with facial feature detection systems, in accordance with an example implementation. In example implementations, webcam images are filtered through a live Web-based face detection system, which can be implemented through any face detection system known in the art. The example of FIGS. 3A to 3C illustrates an example feature extraction based on a straight-on view of the face. Face detection can be determined in 109 or 115 based on the number of facial features being detected exceeding a predetermined threshold.

Figure 4:
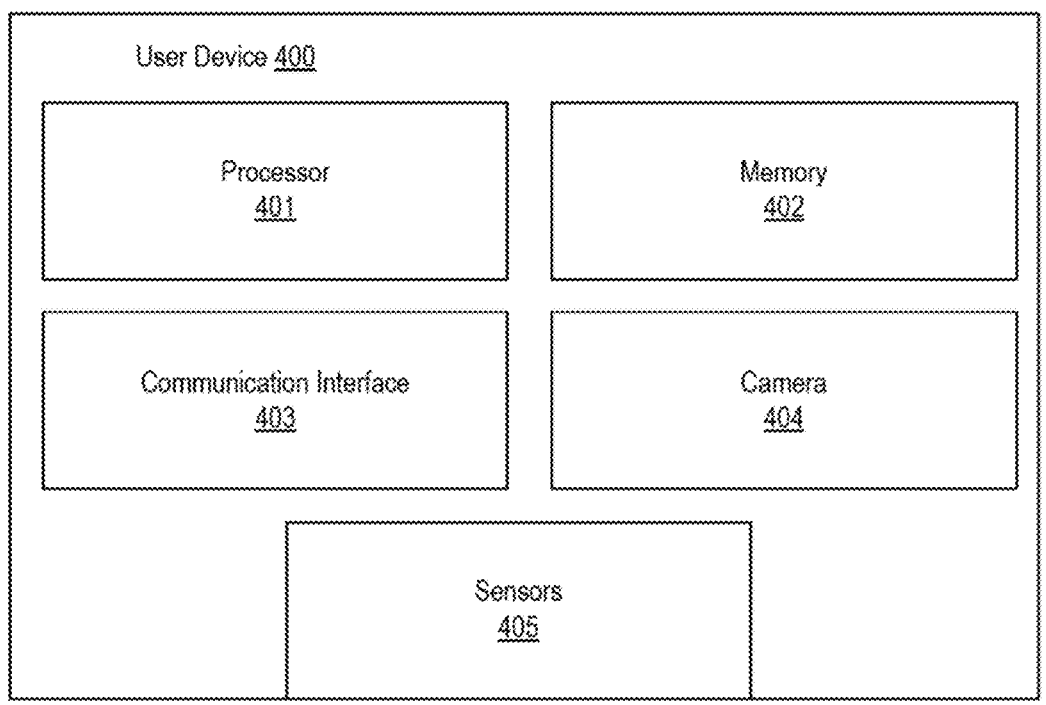
FIG. 4 illustrates an example user device upon which example implementations may be applied.
Figure 5:
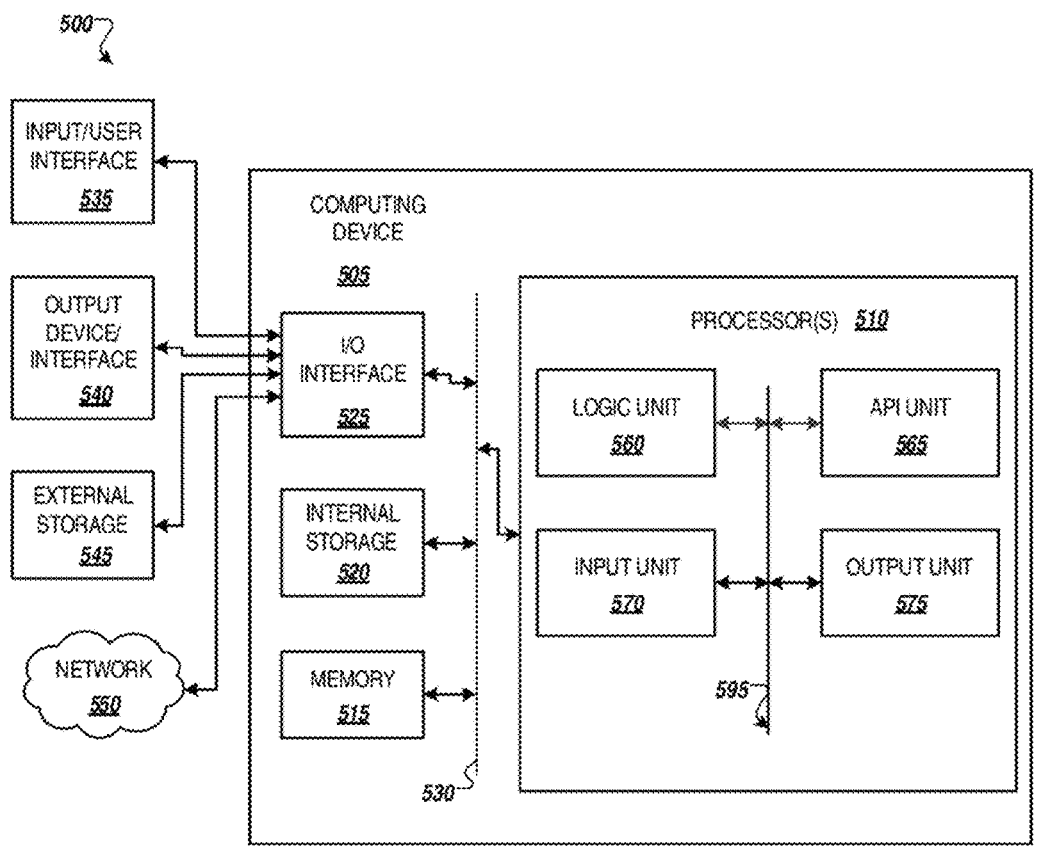
FIG. 5 illustrates an example computing environment with an example computer device suitable for use in some example implementations, such as an apparatus to facilitate the video conference across multiple user devices.

FIG. 4 illustrates an example user device upon which example implementations may be applied. User device 400 may include processor 401, memory 402, communication interface 403, camera 404 and sensors 405. Memory 402 may include one or more applications, such as a video conferencing application configured to connect to an apparatus facilitating the video conference as illustrated in FIG. 5. Video conferencing application can be loaded into processor 401 for execution by the mobile device.

Camera 404 may be utilized to detect the face of the user as illustrated in FIGS. 3A to 3C, wherein processor 401 is configured to conduct feature extraction on the video received by the camera to determine if the user is facing the device. Sensors 405 may also be configured to detect input depending on the desired implementation. For examples, sensors 405 can include audio detectors (e.g. microphones) that can be utilized to detect audio from the user for implementing the flow at 109 and 115. Sensors 405 may also be in the form of gyroscopes or accelerometers, to detect motion and/or the orientation of the device for determining if the device is in use by the user. If the device is in use by the user, then the apparatus managing the video conference can be configured to utilize the animated avatar.

Communication interface 403 can be configured to transmit video from the user device to the apparatus facilitating the video conference. Communication interface 403 can also be configured to transmit other information to the video conference, such as audio from sensors 405, keyboard/text input, instructions to the video conference server to replace the video from the device 400 with an animated avatar, and other input depending on the desired implementation.

Processor 401 can be configured to detect one or more events from the video of the camera. When processor 401 detects the one or more events from the video of the camera that is transmitted to the apparatus configured to manage the video conference, processor 401 may be configured to transmit instructions through communication interface 403 to the apparatus to replace, in the video conference, the video from the apparatus with an animation having a plurality of keyframes selected from video frames involving the user.

The one or more events to be detected by processor 401 can be conducted according to any desired implementation. In an example implementation, one or more events can involve a detection of one or more persons other than the user in the video. Should one or more persons become in view of the user, the processor 401 can be instructed to send instructions to the apparatus managing the video conference to change the video of the user to the selected animated avatar. In another example implementation, the one or more events can based on feature extraction of one or more facial features of the user as illustrated in FIGS. 3A to 3C. When the processor 401 fails to detect certain facial features of the user, the processor 401 can be configured to transmit the instructions to change the video of the user to the selected avatar.

The one or more events can also involve a stoppage of the video. In an example implementation, processor 401 may receive an indication from the apparatus managing the video conference that the video received from the user device 400 has a bad connection or insufficient throughput. In such a situation, processor 401 can transmit instructions to change the video to the animated avatar.

In additional example implementations, when the video is disabled or face detection has failed, user activity can still be identified from sensors 405. In such example implementations, processor 401 can be configured to transmit the instructions to the apparatus managing the video conference to replace the video from the apparatus with the animation.

FIG. 5 illustrates an example computing environment with an example computer device suitable for use in some example implementations, such as an apparatus to facilitate the video conference across multiple user devices. Computer device 505 in computing environment 500 can include one or more processing units, cores, or processors 510, memory 515 (e.g., RAM, ROM, and/or the like), internal storage 520 (e.g., magnetic, optical, solid state storage, and/or organic), and/or I/O interface 525, any of which can be coupled on a communication mechanism or bus 530 for communicating information or embedded in the computer device 505.

Computer device 505 can be communicatively coupled to input/user interface 535 and output device/interface 540. Either one or both of input/user interface 535 and output device/interface 540 can be a wired or wireless interface and can be detachable. Input/user interface 535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 540 may include a display, television, monitor, printer, speaker, braille, or the like. In some example implementations, input/user interface 535 and output device/interface 540 can be embedded with or physically coupled to the computer device 505. In other example implementations, other computer devices may function as or provide the functions of input/user interface 535 and output device/interface 540 for a computer device 505.

Examples of computer device 505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 505 can be communicatively coupled (e.g., via I/O interface 525) to external storage 545 and network 550 for communicating with any number of networked components, devices, and systems, including one or more computer devices of the same or different configuration. Computer device 505 or any connected computer device can be functioning as, providing services of, or referred to as a server, client, thin server, general machine, special-purpose machine, or another label.

I/O interface 525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computer device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. One or more applications can be deployed that include logic unit 560, application programming interface (API) unit 565, input unit 570, output unit 575, and inter-unit communication mechanism 595 for the different units to communicate with each other, with the OS, and with other applications (not shown). The described units and elements can be varied in design, function, configuration, or implementation and are not limited to the descriptions provided.

In some example implementations, when information or an execution instruction is received by API unit 565, it may be communicated to one or more other units (e.g., logic unit 560, input unit 570, output unit 575). In some instances, logic unit 560 may be configured to control the information flow among the units and direct the services provided by API unit 565, input unit 570, output unit 575, in some example implementations described above. For example, the flow of one or more processes or implementations may be controlled by logic unit 560 alone or in conjunction with API unit 565. The input unit 570 may be configured to obtain input for the calculations described in the example implementations, and the output unit 575 may be configured to provide output based on the calculations described in example implementations.

Processor(s) 510 can be configured to manage a video conference over a plurality of user devices. During the management of the video conference, processor(s) 510 can receive one or more video streams from each of the user devices participating in the video conference and provide them to the user devices depending on the desired implementation. In example implementations, processor(s) 510 can be configured to receive instructions from user devices to replace the video with an animated avatar corresponding to the user, and process the instructions to replace the video sent to the user devices with the animated avatar corresponding to the user.

Figure 6A:
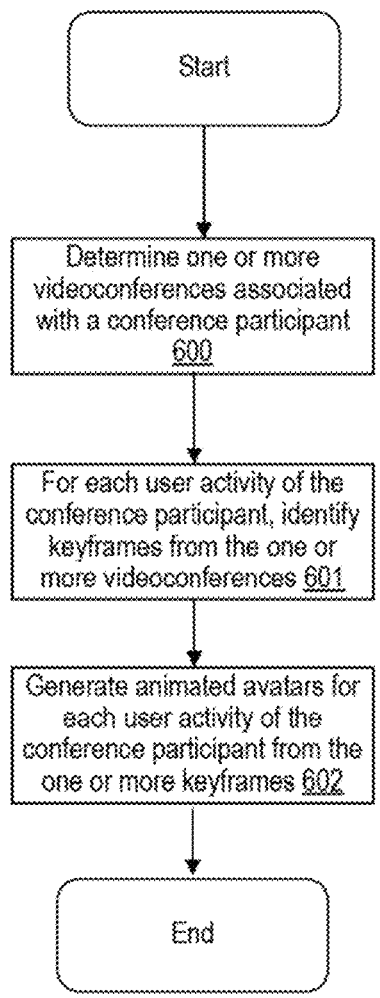
FIG. 6A illustrates an example flow diagram for generating the animation for the video conference participant in accordance with an example implementation.

Processor(s) 510 can also be configured to detect interruptions in the video stream through any desired implementation. Such interruption events can include detection of an interruption in the video connection, an instruction from the user device indicating that the connection is unstable, or by other methods according to the desired implementation. For a detection of an interruption FIG. 6A illustrates an example flow diagram for generating the animation for the video conference participant in accordance with an example implementation. Specifically, FIG. 6A illustrates an example flow for execution by the apparatus managing the video conference as illustrated by FIG. 5. At 600, the video conference managing apparatus determines one or more videoconferences associated with a conference participant (i.e. a user of a user device as illustrated in FIG. 4). The one or more videoconferences can include previous videoconferences that are archived by the apparatus of FIG. 5 that involve the user, and can also involve the live videoconferences currently managed by the apparatus of FIG. 5 that involve the conference participant, depending on the desired implementation. The database can also include a list of conference participants for each of the videoconferences so that the users can be indexed to the corresponding videoconferences.

At 601, the apparatus managing the videoconference identifies keyframes from the one or more videoconferences for each user activity of the conference participant. In example implementations, keyframes are frames determined from by the videoconference application to be frames that are applicable to a user activity of a particular conference participant. Keyframes can be detected through feature extraction as illustrated in FIGS. 3A to 3C, or through any desired implementation. The application utilized to facilitate the videoconference by the apparatus can include one or more user activity definitions for replacing the video stream from the user devices with the animated avatar. The user activity definitions are activities that can be detected by the video stream or by the user device as defined by the application facilitating the videoconference. Such activities can involve typing activity, interruption in the video stream, other persons entering within the camera view, and so on. For each of these activities, the keyframes can be detected based on the definition of the user activity and the desired implementation to be utilized. For example, the keyframes pertaining to the users face can be detected based on feature extraction as illustrated in FIGS. 3A to 3C. In an example implementation for generating an animation for a user activity where the conference participant is participating, but another person or animal has entered the camera view (e.g., a child, a cat, etc.), or when the video stream is interrupted but the conference participant is still connected, or for when the detection of facial features of the conference participant falls below a predetermined threshold, a frame is detected having a threshold of features that exceed a predetermined threshold (e.g. as set by the application or according to the desired implementation). The animation can be generated from the following consecutive frames from the detected frame having the threshold of features, and then used to replace the video stream when the apparatus detects that another person or animal has entered the video stream although the conference participant is otherwise connected. In another example implementation or generating an animation for a user activity where the user is typing or using the mouse of the user device, keyframes can be selected from videoconferences from when mouse activity was detected in the context of sharing the screen of the user device. Similarly, following consecutive frames from the detected keyframe can be utilized for generation of the animated avatar to illustrate the mouse activity. At 602, the apparatus managing the videoconference generates animated avatars for each user activity of the conference participant from the one or more keyframes as determined from 601.

Figure 6B:
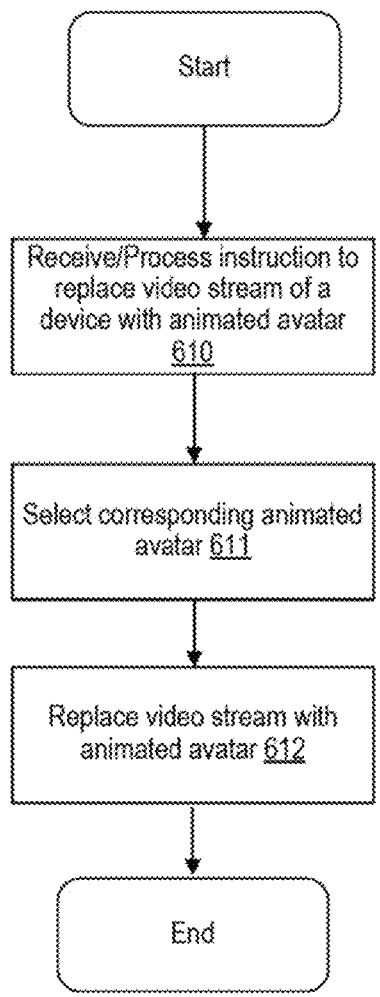
FIG. 6B illustrates an example flow diagram for replacing the video stream of a conference participant with an animated avatar in accordance with an example implementation.

FIG. 6B illustrates an example flow diagram for replacing the video stream of a conference participant with an animated avatar in accordance with an example implementation. Specifically, FIG. 6B illustrates an example flow for execution by the apparatus managing the video conference as illustrated by FIG. 5. At 610, the apparatus managing the video conference receives an instruction from the user device to replace the video stream with an animated avatar generated by the flow of FIG. 6A. The instruction from the user device can include the corresponding user activity which can instruct the apparatus to select the corresponding animated avatar. For example, if the user device detects keyboard or mouse activity, then an instruction is sent to the apparatus indicating that keyboard or mouse activity was detected by the user device. Similarly, when the user device detects an additional person or animal entering the video stream, or when the user device fails to detect facial features beyond a predetermined threshold, the user device can send instructions to the apparatus managing the video conference to indicate that the user is still connected, but the video should be replaced by an animated avatar. In an additional example implementation, the apparatus can detect an interruption in the video stream from the user device and then select the animated avatar based on the connection of the user device. For example, if the user device is still connected to the video conference but the video stream connection is inconsistent, then an animated avatar can be selected to indicate that the user is still active as indicated in FIG. 1. If the user device is disconnected, then a static image can be utilized in place of the video stream. At 611, the apparatus managing the videoconference selects the animated avatar corresponding to the detected user activity. At 612, the apparatus replaces the video stream from the corresponding conference participant with the selected animated avatar. The animated avatar is provided to the user devices of the remaining conference participants in replacement of the video stream from the conference participant.

Figure 6C:
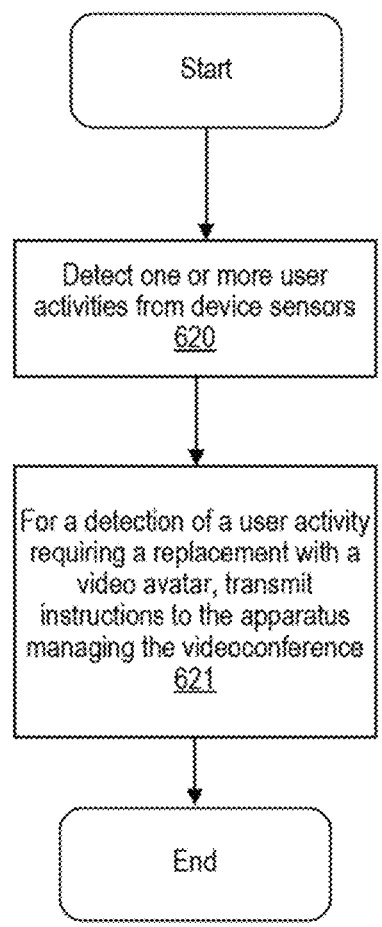
FIG. 6C illustrates an example flow diagram for instructing the apparatus to replace the video stream of a user device with an animated avatar corresponding to the conference participant in accordance with an example implementation.

FIG. 6C illustrates an example flow diagram for instructing the apparatus to replace the video stream of a user device with an animated avatar corresponding to the conference participant in accordance with an example implementation. The implementation for the flow at FIG. 6C can be conducted by the user device as illustrated in FIG. 4. At 620, the user device detects one or more user activities from device sensors. The activities can be defined by the application facilitating the video conference as described in FIGS. 6A and 6B. User activities are detected from the camera, from the keyboard or mouse attached to the user device, or from other sensors (e.g. gyroscope, accelerometers, etc.), depending on the desired implementation. At 621, for a detection of a user activity requiring a replacement with a video avatar, the user device is configured to transmit instructions to the apparatus managing the videoconference to replace the video stream with the animated avatar corresponding to the user activity.

Table 1 illustrates example management information for the apparatus managing the videoconference. Specifically, the apparatus of FIG. 5 can manage a mapping between stored avatars, corresponding conference participants, and the detected user activity. When instructions are received by the apparatus of FIG. 5 indicating the user ID and the detected user activity along with a request to replace the video stream with the corresponding animation, the apparatus managing the videoconference can refer to the management information for replacing the video stream of the corresponding conference participant with the corresponding animation. For example, should keyboard/mouse activity be detected from the device of User 1, then Avatar1 may be provided to the web conference participants as a representative of User 1.

TABLE 1

Management information for mapping animations to user activities

| User ID | Detected user activity | Animation to be used |
|---------|------------------------|----------------------|
| User 1  | Keyboard/Mouse Activity | Avatar1 |
| User 1  | Interrupted video stream | Avatar2 |
| User 2  | Keyboard/Mouse Activity | Avatar3 |

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. An apparatus associated with a user in a video conference, comprising:
    a memory configured to manage an association between a plurality of animations and a plurality of events, the plurality of events comprising one or more user activities and an interruption in the video stream, wherein each event of the plurality of events is associated with an animation from the plurality of animations, wherein each of the plurality of animations comprises a plurality of keyframes selected from video frames involving the user;
    a camera; and
    a processor, configured to:
    for a detection of one or more events from video of the camera that is provided to a server configured to manage the video conference, provide instructions to the server to replace, in the video conference, the video from the apparatus with an animation selected from the plurality of animations in the memory that corresponds to the detected one or more events from the video of the camera.

2. The apparatus of claim 1, wherein the detection of the one or more events comprises a detection of one or more persons other than the user in the video.

3. The apparatus of claim 1, wherein the processor is configured to conduct detection of the one or more events based on feature extraction of one or more facial features of the user, and wherein the processor is configured to transmit the instructions to the server upon failure of detection of the one or more facial features of the user.

4. The apparatus of claim 1, wherein the detection of the one or more events comprises a detection of a stoppage of the video.

5. The apparatus of claim 1, wherein the video frames associated with the user are generated from the video of the camera during the video conference.

6. The apparatus of claim 1, wherein the apparatus comprises one or more sensors, and wherein the processor is configured to, for the camera being disabled and for a detection of one or more events from the one or more sensors, transmit the instructions to the server to replace, in the video conference, the video from the apparatus with the animation.

7. A non-transitory computer readable medium storing instructions for an apparatus associated with a user in a video conference, the instructions comprising:
    managing an association between a plurality of animations and a plurality of events, the plurality of events comprising one or more user activities and an interruption in the video stream, wherein each event of the plurality of events is associated with an animation from the plurality of animations, wherein each of the plurality of animations comprises a plurality of keyframes selected from video frames involving the user, and
    for a detection of one or more events from video of a camera that is provided to a server configured to manage the video conference, providing instructions to the server to replace, in the video conference, the video from the apparatus with an animation selected from the plurality of animations that corresponds to the detected one or more events from the video of the camera.

8. The non-transitory computer readable medium of claim 7, wherein the detection of the one or more events comprises a detection of one or more persons other than the user in the video.

9. The non-transitory computer readable medium of claim 7, wherein the detection of the one or more events is based on feature extraction of one or more facial features of the user, and wherein the transmitting the instructions to the server is conducted upon failure of detection of the one or more facial features of the user.

10. The non-transitory computer readable medium of claim 7, wherein the detection of the one or more events comprises a detection of a stoppage of the video.

11. The non-transitory computer readable medium of claim 7, wherein the video frames associated with the user are generated from the video of the camera during the video conference.

12. The non-transitory computer readable medium of claim 7, wherein the instructions further comprise, for the camera being disabled and for a detection of one or more events from one or more sensors, transmitting the instructions to the server to replace, in the video conference, the video from the apparatus with the animation.

13. A method for an apparatus associated with a user in a video conference, the method comprising:
   managing an association between a plurality of animations and a plurality of events, the plurality of events comprising one or more user activities and an interruption in the video stream, wherein each event of the plurality of events is associated with an animation from the plurality of animations, wherein each of the plurality of animations comprising a plurality of keyframes selected from video frames involving the user, and
   for a detection of one or more events from video of a camera that is provided to a server configured to manage the video conference, providing instructions to the server to replace, in the video conference, the video from the apparatus with an animation selected from the plurality of animations that corresponds to the detected one or more events from the video of the camera.

14. The method of claim 13, wherein the detection of the one or more events comprises a detection of one or more persons other than the user in the video.

15. The method of claim 13, wherein the detection of the one or more events is based on feature extraction of one or more facial features of the user, and wherein the transmitting the instructions to the server is conducted upon failure of detection of the one or more facial features of the user.

16. The method of claim 13, wherein the detection of the one or more events comprises a detection of a stoppage of the video.

17. The method of claim 13, wherein the video frames having the user are generated from the video of the camera during the video conference.

18. The method of claim 13, further comprising, for the camera being disabled and for a detection of one or more events from one or more sensors, transmitting the instructions to the server to replace, in the video conference, the video from the apparatus with the animation.

19. The method of claim 13, wherein the one or more sensors comprises at least one of a wearable device and a mobile device, wherein for the camera being disabled and for the at least one of the wearable device and the mobile device indicative of the user being active, transmitting the instructions to the server to replace, in the video conference, the video from the apparatus with an animation.

20. The method of claim 13, wherein the plurality of keyframes of the animation are user selected from previous videoconference recordings involving the user.

* * * * *